UNITED STATES PATENT OFFICE.

JAMES W. HARTIGAN, OF MORGANTOWN, WEST VIRGINIA, ASSIGNOR OF ONE-HALF TO EDWARD S. AVIS.

DENTAL ANODYNE.

SPECIFICATION forming part of Letters Patent No. 445,298, dated January 27, 1891.

Application filed December 10, 1890. Serial No. 374,146. (No specimens.)

*To all whom it may concern:*

Be it known that I, JAMES W. HARTIGAN, a citizen of the United States, residing at Morgantown, in the county of Monongalia and State of West Virginia, have invented a new and useful Composition of Matter to be Used for the Extraction of Teeth without Pain, of which the following is a specification.

My composition consists of the following ingredients, combined in the proportions stated, viz: alcohol, ninety-five per cent., three and one-half fluid drams; fluid extract of hydrastis canadensis, one fluid dram; fluid extract of geranium maculatum, one and one-half fluid dram; salicylic acid, thirty grains; oil of cloves, one fluid dram; carbolic acid, twenty drops; hydrochloride of cocaine, forty-five grains; Squibb's sulphuric ether, one fluid dram. These ingredients are to be thoroughly agitated until a perfect solution is obtained.

In using the above-named composition the gums surrounding the teeth to be extracted must first be cleansed of all mucus and adhering matter of whatever kind, and then treated, first, by applying to their anterior and posterior surfaces pieces of raw cotton of proper size, saturated with the above composition. The pieces of cotton are to be held in contact with the gums by the thumb and forefinger of the operator (or by an appropriate instrument) for from ten to twenty seconds, at the end of which time there will be a complete superficial anæsthesia in the parts treated. Second, the pieces of cotton are now to be removed, and by means of an ordinary hypodermic syringe from three to five minims of the composition are to be injected into the substance of the gum in front and the same quantity into the substance of the gum behind the tooth. After waiting from forty to eighty seconds after the injection is made the gum is freed from the tooth by means of a lancet, when the tooth can be extracted without pain.

I am aware that a number of compositions are in use in this country for the same purpose. I am also aware that the hydrochlorate of cocaine forms the active part of many of these compositions, and that in not a few cases unfavorable results have occurred from such mixtures even in the hands of professional men; but I am not aware that any of the ingredients of my composition, except alcohol and hydrochloride of cocaine, have ever been used for this purpose, and I am not aware that these two substances have ever been used in the proportions stated.

By the use of the above composition the sensibility of the gums is quickly and efficiently destroyed, permitting the extraction of teeth without pain. The action of the composition is transitory, the tissues returning to their normal condition in a short time. The ingredients are selected to give a harmless composition.

What I claim, and desire to secure by Letters Patent of the United States, is—

The herein-described composition of matter to be used for the painless extraction of teeth, consisting of ninety-five per cent. alcohol, fluid extract of hydrastis canadensis, fluid extract of geranium maculatum, salicylic acid, oil of cloves, carbolic acid, hydrochloride of cocaine, and Squibb's sulphuric ether, in the proportions specified.

JAMES W. HARTIGAN.

Witnesses:
J. M. HAGANS,
MILTON HIRSCHMAN.